(12) United States Patent
Hsieh (10) Patent No.: US 9,562,385 B2
(45) Date of Patent: Feb. 7, 2017

(54) DOOR OPERATOR SYSTEM CAPABLE OF DETECTING A CURRENT-TIME POSITION OF A MOVABLE BARRIER

(71) Applicant: Chung-Hsien Hsieh, New Taipei (TW)

(72) Inventor: Chung-Hsien Hsieh, New Taipei (TW)

( * ) Notice: Subject to any disclaimer, the term of this patent is extended or adjusted under 35 U.S.C. 154(b) by 45 days.

(21) Appl. No.: 14/753,086

(22) Filed: Jun. 29, 2015

(65) Prior Publication Data

US 2016/0090772 A1    Mar. 31, 2016

(30) Foreign Application Priority Data

Sep. 26, 2014    (TW) .............................. 103133407 A (51) Int. Cl.

| | |
|---|---|
| G01R 31/02 | (2006.01) |
| H02H 3/04 | (2006.01) |
| H02H 7/08 | (2006.01) |
| E05F 15/668 | (2015.01) |
| E05F 15/79 | (2015.01) |
| F16H 1/20 | (2006.01) |
| H02P 29/00 | (2016.01) |
| E05F 15/684 | (2015.01) |

(52) U.S. Cl.
CPC ............ *E05F 15/668* (2015.01); *E05F 15/79* (2015.01); *F16H 1/20* (2013.01); *H02P 29/00* (2013.01); *E05F 15/684* (2015.01); *E05Y 2201/71* (2013.01); *E05Y 2400/322* (2013.01); *E05Y 2900/106* (2013.01); *H02P 2203/00* (2013.01)

(58) Field of Classification Search
CPC .......... E05F 15/668; E05F 15/79; H02P 29/00

USPC ......................................................... 318/490
See application file for complete search history.

(56) References Cited

U.S. PATENT DOCUMENTS 7,161,100 B1    1/2007    Hsieh .............................. 200/47

FOREIGN PATENT DOCUMENTS

| TW | 461934 | 11/2000 |
|---|---|---|
| TW | M293965 | 7/2006 |
| TW | M294564 | 7/2006 |

OTHER PUBLICATIONS

Search report 10420325580, TW.
Office action 10420325580, TW.

*Primary Examiner* — Erick Glass
(74) *Attorney, Agent, or Firm* — Bui Garcia-Zamor; Jessica H. Bui, Esq.

(57) ABSTRACT

A door operator system capable of detecting a current-time position of a movable barrier comprises a current-time position detecting device comprising a first gear, a first angular position sensing unit, a revolution counting unit and an arithmetic unit. The first gear is coupled to an output shaft of a motor or a winding shaft. The first angular position sensing unit is provided for detecting a first angular position of the first gear. The revolution counting unit counts the number of revolutions of the first gear. The arithmetic unit calculates a number of total circumferential intervals of the output shaft of the motor or the winding shaft based on $D=(La*X)+A/(360/X)$, where D is the number of the total circumferential intervals, La is the number of revolutions of the first gear, A is the first angular position, X is a number of circumferential intervals per revolution of the first gear.

10 Claims, 6 Drawing Sheets

DOOR OPERATOR SYSTEM CAPABLE OF DETECTING A CURRENT-TIME POSITION OF A MOVABLE BARRIER

BACKGROUND OF THE INVENTION

Field of the Invention

The present invention relates to a door operator system and particularly, to a door operator system capable of detecting a current-time position of a movable barrier.

Description of the Related Art

Generally, a conventional door operator is capable of completely opening a door or completely shutting the door by determining whether an upper stop point or a lower stop point of a movable barrier is reached or not. That is to say, the movable barrier can be stopped or held only at the upper stop point or the lower stop point. However, for some special purposes, the movable barrier is required to be stopped or held at a midway position between the upper stop point and the lower stop point.

U.S. Pat. No. 7,161,100 proposes a limit switch mechanism having a screw rod coupled to a winding shaft, wherein the screw rod is provided with two switch actuators thereon. The switch actuators are moved along the screw rod while the screw rod is rotated along with the winding shaft. If one of the switch actuators triggers a corresponding limit switch at the end of the screw rod, the triggered limit switch signals to the door operator that the upper stop point or the lower stop point is reached, thereby disabling the door operator.

However, as stated above, due to the intrinsic structure of this kind of prior art door operation, the conventional door operator is capable of determining whether the upper stop point or the lower stop point of the movable barrier is reached or not but incapable of detecting a current-time position of the movable barrier at any time. As such, the conventional door operator is incapable of stopping or holding the movable barrier at a midway position. In the case that at least one limit switch is in failure, the electric motor of the door operator may be still electrically energized even if the upper stop point or the lower stop point has been reached so that the components of the door operator may be damaged.

A variable frequency motor is a motor capable of operating at a variable speed, for example a descending speed or an ascending speed. Use of the variable frequency motor in the door operator is desired, but the absence of capability of detecting a current-time position of a movable barrier makes the use of the variable frequency motor in the door operator difficult.

SUMMARY OF THE INVENTION

The main objective of the present invention is to provide a door operator system with a current-time position detecting device to acquire a current-time position of a movable barrier at any time, so as to perform an advanced operation of the door operation system.

To achieve the above objective, the present invention provides a door operator system comprising: an electric motor, a current-time position detecting device and a winding shaft for winding or unwinding a movable barrier, wherein an output shaft of the electric motor is coupled to the winding shaft, the current-time position detecting device comprises: a first gear, a first angular position sensing unit, a revolution counting unit and an arithmetic unit. The first gear is coupled to the output shaft of the electric motor or the winding shaft, the first angular position sensing unit detects and outputs a first angular position of the first gear, the revolution counting unit counts and outputs the number of revolutions of the first gear, and the arithmetic unit is electrically connected to the first angular position sensing unit and the revolution counting unit. The arithmetic unit receives the first angular position from the first angular position sensing unit and the number of revolutions from the revolution counting unit and calculates a number of total circumferential intervals of the output shaft of the electric motor or the winding shaft based on the following equation (1):

$$D=(La*X)+A/(360/X) \qquad (1)$$

where D is the number of the total circumferential intervals of the output shaft of the electric motor or the winding shaft, La is the number of revolutions of the first gear, A is the first angular position, and X is a number of circumferential intervals per revolution of the first gear.

Accordingly, since the first gear may be coupled to the output shaft of the electric motor or the winding shaft, the number of the total circumferential intervals of the first gear can be obtained by detecting the number of revolutions and the current-time angular position of the first gear. The number of the total circumferential intervals of the first gear is correlated to a total angular displacement of the output shaft of the electric motor or the winding shaft, and hence a current-time position of the movable barrier driven by the winding shaft can be obtained indirectly.

In the case that the first gear is coupled to or attached on the winding shaft, the arithmetic unit is configured to calculate the total displacement of the movable barrier based on the following equation (2):

$$Dd=D(C/X) \qquad (2)$$

where Dd is the total displacement of the movable barrier, C is a circumference of the winding shaft. Accordingly, in the case that the first gear is coupled to or attached on the winding shaft, the total displacement of the movable barrier can be obtained by multiplying the number of the total circumferential intervals of the winding shaft and the length per circumferential interval of the winding shaft.

Optionally, the present invention further comprises a speed reducer through which the output shaft of the electric motor is coupled to the winding shaft. The speed reducer provides speed reduction from the output shaft of the electric motor to the winding shaft so as to convert the rotational speed of the output shaft to a reduced rotational speed in a speed reduction ratio. In the case that the first gear is coupled to or attached on the output shaft of the electric motor, the arithmetic unit calculates the total displacement of the movable barrier based on the following equation (3):

$$Dd=D*(C/X)/R \qquad (3)$$

where Dd is the total displacement of the movable barrier, C is the circumference of the winding shaft, and R is the speed reduction ratio of the speed reducer. Accordingly, in the case that the first gear is coupled to or attached on the output shaft of the electric motor, the total displacement of the movable barrier can be obtained by dividing the product of the number of the total circumferential intervals of the output shaft of the electric motor and the length per circumferential interval of the winding shaft by the speed reduction radio.

Furthermore, the revolution counting unit may comprise a second gear and a second angular position sensing unit. The second gear is engaged with the first gear. The second angular position sensing unit detects and outputs a second angular position of the second gear. A number of teeth of the first gear is different from a number of teeth of the second gear. The number of circumferential intervals per revolution of the first gear may be identical to the number of the teeth of the first gear. The arithmetic unit is electrically connected to the second angular position sensing unit. The arithmetic unit receives the first angular position from the first angular position sensing unit and the second angular position from the second angular position sensing unit and calculates the number of revolutions of the first gear based on the following equation (4):

$$La=W/(360/Y) \quad (4)$$

where W is the angular difference between the first angular position and the second angular position, Y is the number of the teeth of the second gear. Accordingly, by means of such gears, the number of revolutions of the first gear can be obtained based on the angular difference between the angular position of the first gear and the angular position of the second gear.

According to the present invention, the angular difference between the first angular position and the second angular position is calculated based on the following equations (5) and (6):

$$W=[A-(360-B)] \text{ if } [A-(360-B)]\geq0 \quad (5)$$

$$W=[A-(360-B)]+360 \text{ if } [A-(360-B)]<0 \quad (6)$$

where B is the second angular position. As such, a positive angular difference between the first angular position and the second angular displacement is ensured by the equations (5) and (6). In the case of a negative angular difference, the angular difference should be compensated with 360 degrees so as to prevent an operational error of the arithmetic unit.

Also, the revolution counting unit of the present invention may comprise a second gear and a second angular position sensing unit. The second gear is engaged with the first gear, and the number of the teeth of the second gear is a multiple of the number of the teeth of the first gear. The second angular position sensing unit detects and outputs a second angular position of the second gear. The second angular position sensing unit is electrically connected to the arithmetic unit. The arithmetic unit receives the first angular position from the first angular position sensing unit and the second angular position from the second angular position sensing unit. The number of revolutions of the first gear is calculated based on the following equation (7):

$$La=B/(360/Yb) \quad (7)$$

where B is the second angular position, Yb is a first ratio of the number of the teeth of the second gear to the number of the teeth of the first gear. Accordingly, the angular position of the second gear can be converted into the number of revolutions of the first gear. Briefly, the second gear is provided to indicate the number of revolutions of first gear.

Preferably, the revolution counting unit of the present invention may further comprise a third gear and a third angular position sensing unit. The third gear is engaged with the second gear. A number of teeth of the third gear is a multiple of the number of the teeth of second gear. The third angular position sensing unit detects and outputs a third angular position of the third gear. The third angular position sensing unit is electrically connected to the arithmetic unit. The arithmetic unit receives the first angular position from the first angular position sensing unit, the second angular position from the second angular position sensing unit and the third angular position from the third angular position sensing unit. The number of revolutions of the first gear is calculated based on the following equation (8):

$$La=B/(360/Yb)+Yb*[C/(360/Yc)] \quad (8)$$

where C is the third angular position, Yc is a second ratio of the number of the teeth of the third gear to the number of the teeth of the second gear. Accordingly, the angular positions of the second gear and the third gear can be converted into the number of revolutions of the first gear. Briefly, the second gear and the third gear are provided to indicate the number of total revolutions of first gear. Specifically, the second gear is provided to indicate the number of revolutions of the first gear, and the third gear is provided to indicate the number of revolutions of the second gear, so as to extend the maximum number of total revolutions which can be detected.

Also, the second gear of the present invention may be composed of an upper gear and a lower gear which are integrally linked. The upper gear is engaged with the first gear, and the lower gear is engaged with the third gear. At this time, the first ratio refers to a ratio of a number of teeth of the upper gear to the number of the teeth of the first gear, and the second ratio refers to a ratio of the number of the teeth of the third gear to a number of teeth of the lower gear. Accordingly, the space occupied by the gears can be reduced with the design of the upper gear and the lower gear. The maximum number of revolutions of the first gear which can be detected can be extended by the gear ratios of the gear arrangement.

Moreover, the first angular position sensing unit of the present invention may be a rotational angle magnetic induction chip, and each of the second angular position sensing unit and the third angular position sensing unit may be an optical disk angle sensing module. The optical disk angle sensing module comprises an inner annular section, a middle annular section, an outer annular section, an inner optical transducer, a middle optical transducer and an outer optical transducer. Each of the second gear and the third gear is provided with the inner annular section, the middle annular section and the outer annular section. The inner optical transducer detects the inner annular section, the middle optical transducer detects the middle annular section, and the outer optical transducer detects the induction outer ring. The inner annular section, the middle annular section, the outer annular section, the inner optical transducer, the middle optical transducer and the outer optical transducer are arranged in such a way that a 3-bit Gray code can be obtained. According to the present invention, an angular of a gear can be detected by an optical disk angle sensing module which is arranged in such a way that a 3-bit Gray code can be obtained and which is low cost.

DESCRIPTION OF THE PREFERRED EMBODIMENTS

In describing the preferred embodiment of the door operator system of the present invention, reference will be made herein to the drawings in which the same element is designated by the same reference numeral.

Figure 1:
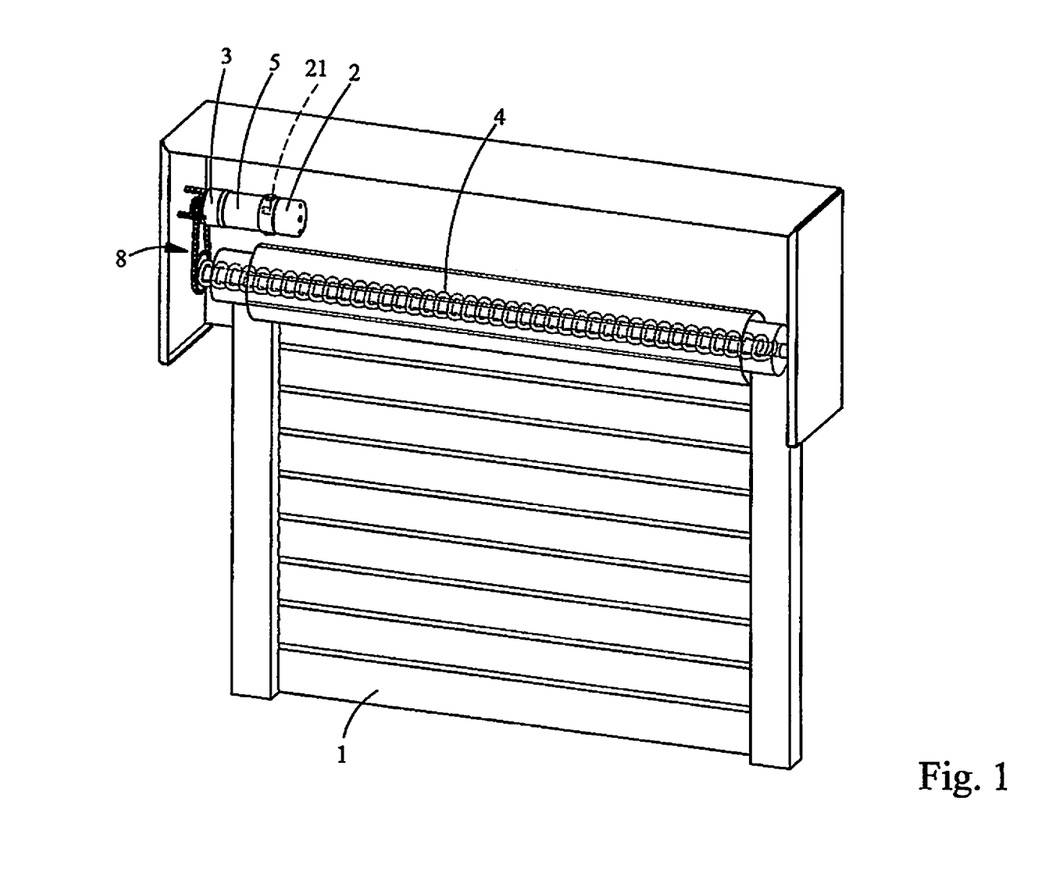
FIG. 1 is a schematic view of a preferred embodiment of the present invention.
Figure 2:
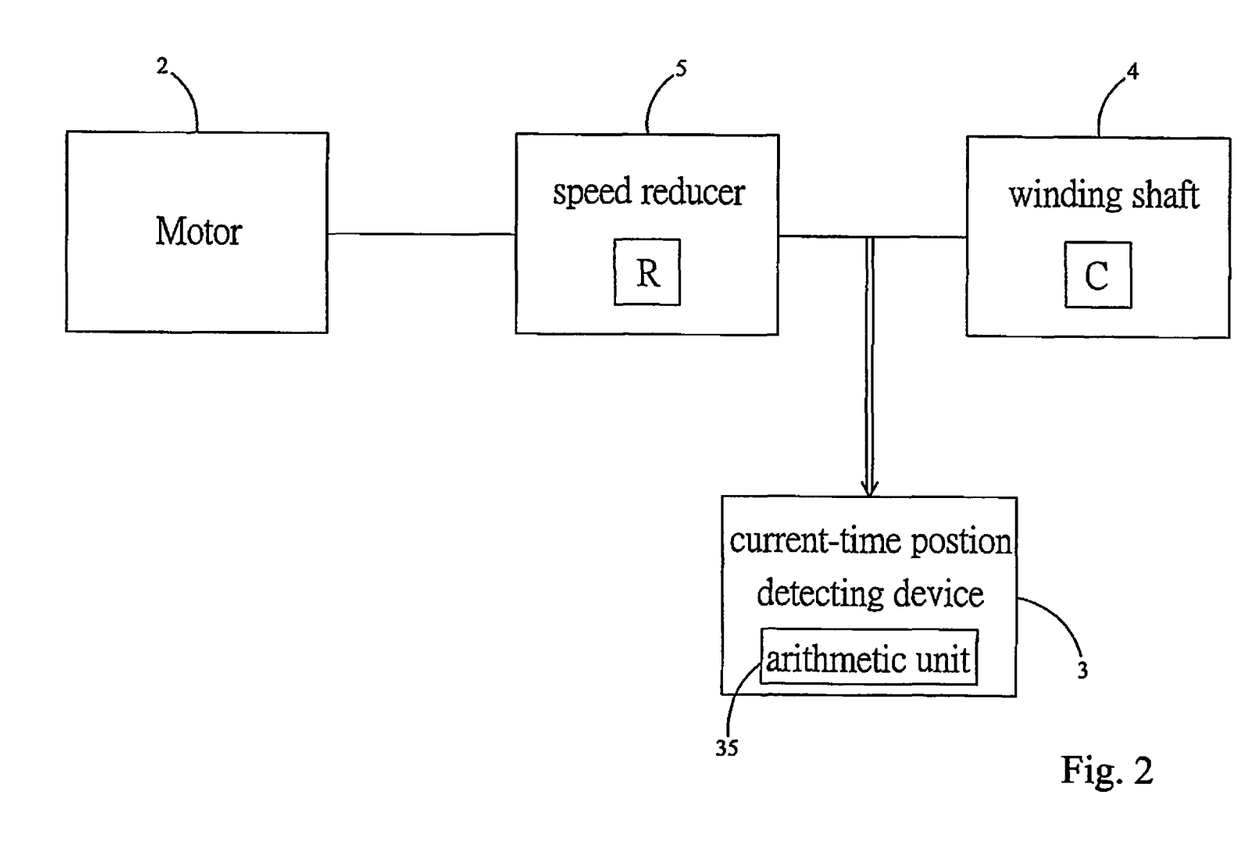
FIG. 2 is a block diagram of the preferred embodiment of the present invention.
Figure 3:
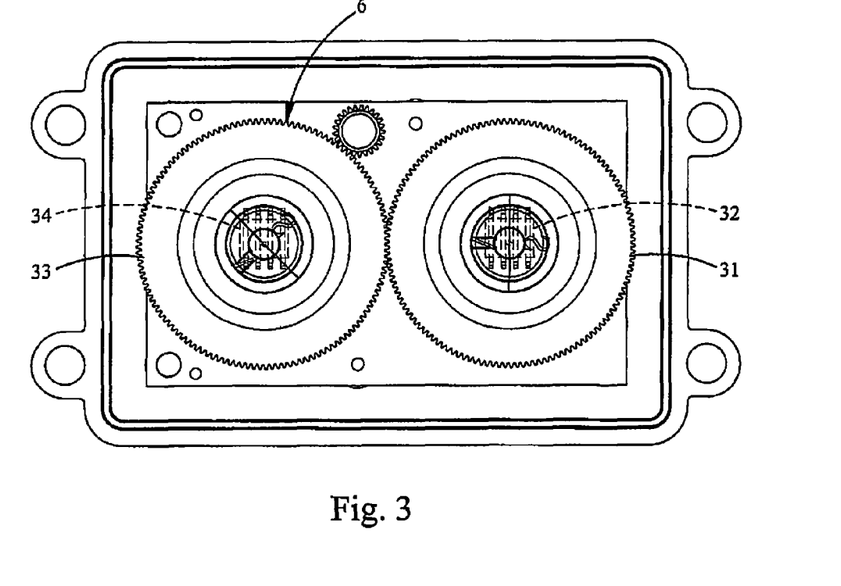
FIG. 3 is a schematic view of a first embodiment of the current-time position detecting device of the present invention.

With reference to FIGS. 1 to 3, FIG. 1 is a schematic view of a preferred embodiment of the present invention, FIG. 2 is a block diagram of the preferred embodiment of the present invention, and FIG. 3 is a schematic view of a first embodiment of the current-time position detecting device of the present invention. As shown in the drawings, the door operator system comprises an electric motor 2, a current-time position detecting device 3, a winding shaft 4 and a movable barrier 1 which is wound on the winding shaft 4. The output shaft 21 of the electric motor 2 is coupled to the winding shaft 4 via a speed reducer 5 and a chain transmission mechanism 8. The current-time position detecting device 3 is disposed between the speed reducer 5 and the winding shaft 4.

The current-time position detecting device 3 comprises a first gear 31, a first angular position sensing unit 32, a revolution counting unit 6 and an arithmetic unit 35. The first gear 31 is coupled to or attached on the winding shaft 4 which is coupled to the output shaft 21 of the electric motor 2 via the speed reducer 5. The first angular position sensing unit 32 detects and outputs a first angular position A of the first gear 31. The first angular position sensing unit 32 used in this embodiment is a rotational angle magnetic induction chip, for example, the sensor MLX90316 produced by Melexis. The revolution counting unit 6 calculates and outputs the number of revolutions Lg of the first gear 31.

An arithmetic unit 35 is electrically connected to the first angular position sensing unit 32 and the revolution counting unit 6. The arithmetic unit 35 receives the first angular position A from the first angular position sensing unit 32 and the number of revolutions La from the revolution counting unit 6. The number of the total circumferential intervals D of the winding shaft 4 is calculated based on the following equation (1):

$$D=(La*X)+A/(360/X) \quad (1)$$

where D is the number of the total circumferential intervals of the winding shaft 4, La is the number of revolutions of the first gear 31, A is the first angular position, and X is the number of circumferential intervals per revolution of the first gear 31. The number of the total circumferential intervals D of the winding shaft 4 can be calculated according to the number of revolutions and the current-time angular position of the first gear 31. The number of the total circumferential intervals of the winding shaft 4 is correlated to a total displacement of the movable barrier caused by operation of the electric motor 2 and hence is also correlated to the current-time position of the movable barrier.

The number of circumferential intervals per revolution X or the number of the total circumferential intervals D can be preset, if high degree of accuracy becomes important, as required by a user. Of course, the number of circumferential intervals per revolution X may be predetermined depending on the resolution capability of the first angular position sensing unit 32. For the sensor MLX90316 with the resolution capability of 12 BIT used in this embodiment, the number of circumferential intervals per revolution X is not more than 4096. Since the resolution capability of 7 BIT is sufficient for the door operation, the number of circumferential intervals X of 128 is sufficient. In a first embodiment, for convenience of calculation, the first gear 31 is formed with 127 teeth, and the number of circumferential intervals per revolution X is predetermined to be the number of the teeth of the first gear 31, i.e., 127.

In the case that the first gear 31 is attached on or coupled to the winding shaft with a reduction ratio of 1, the upward or downward displacement of the movable barrier 1 can be calculated by the arithmetic unit 35 based on the following equation:

$$Dd=D(C/X) \quad (2)$$

where Dd is the total displacement of the movable barrier, D is the number of the total circumferential intervals of the winding shaft 4, C is the circumference of the winding shaft 4, and X is the number of circumferential intervals per revolution of the first gear 31. In other words, the total displacement of the movable barrier 1 can be obtained by multiplying the number of the total circumferential intervals D of the winding shaft 4 and the length per circumferential interval of the winding shaft In the case that the current-time position detecting device 3 is disposed between the speed reducer 5 and the output shaft 21 of the electric motor 2, the speed reduction ratio of the output shaft 21 of the motor 2 to the winding shaft 4, for example, the speed reduction ratio R of the speed reducer 5 and the speed reduction ratio of another speed reduction mechanism, such as the chain transmission mechanism 8 may be considered. Taking the speed reduction ratio R of the speed reducer 5 into consideration, the total displacement Dd of the movable barrier 1 is calculated by the arithmetic unit 35 based on the following equation (3):

$$Dd=D*(C/X)/R \quad (3)$$

where Dd is the total displacement of the movable barrier 1, D is the number of total circumferential intervals of the output shaft 21 of the motor 2, C is the circumference of the winding shaft, X is the number of circumferential interval per revolution of the first gear 31, R is the speed reduction ratio. In the case that the first gear 31 is attached on the output shaft 21 of the motor 2, the total displacement and hence the current-time position of the movable barrier 1 can be obtained by dividing the product of the number of the total circumferential intervals D of the output shaft 21 of the electric motor 2 and the length per circumferential interval of the winding shaft 4 by the speed reduction radio R.

With reference to FIG. 3, the revolution counting unit 6 of the present embodiment comprises a second gear 33 and a second angular position sensing unit 34. The second gear 33 is engaged with the first gear 31. The second angular position sensing unit 34 detects and outputs a second angular position B of the second gear 33. Similarly, the second angular position sensing unit 34 of the present embodiment is a rotational angle magnetic induction chip. The arithmetic unit 35 is electrically connected to the first rotational angle sensing unit 32 and the second angular position sensing unit 34. The arithmetic unit 35 receives the first angular position A from the first angular position sensing unit 32 and the second angular position B from the second angular position sensing unit 34 and calculates the number of revolutions La of the first gear 31 based on the following equation (4):

$$La = W/(360/Y) \quad (4)$$

where La is the number of revolutions of the first gear 31, W is the angular difference between the first angular position A and the second angular position B, Y is the number of the teeth of the second gear 33. In other words, by means of such gears, the number of revolutions of the first gear 31 can be calculated by the revolution counting unit 6 of the present embodiment based on the angular difference between the first angular position A of the first gear 31 and the second angular position B of the second gear 33.

Of course, the angular difference W between the first angular position A and the second angular position B may be negative. In the case of a negative angular difference, it will result in an operational error. Therefore, the angular difference W should be calculated based on the following two equations (5) and (6):

$$W = [A-(360-B)] \text{ if } [A-(360-B)] \geq 0 \quad (5)$$

$$W = [A-(360-B)] + 360 \text{ if } [A-(360-B)] < 0 \quad (6)$$

where W is the angular difference between the first angular position A and the second angular position B. It is noted that the following example is provided for illustrative purpose. The number of the teeth of the first gear 31 is 127 (identical to the number of circumferential intervals per revolution X), and the number of the teeth Y of the second gear 33 is 128. If the first angular position A of 0 and the second angular position B of 42.1875 degrees are detected, the angular difference W would be negative if A and B is substituted in the equation (5). Therefore, A and B should be substituted in the equation (6), and the angular difference W of 42.1875 degrees is obtained. Then, the angular difference W is substituted in the equation (4), and the number of revolutions La of the first gear 31 of 15 is obtained. The number of revolutions La is further substituted in the equation (1), and the number of the total circumferential intervals D of the output shaft 21 of the motor 2 of 1905 is obtained. In the case that the speed reduction ratio is of 1:5 and the winding shaft 4 has a diameter of, for example, 710 mm, the total displacement Dd of the movable barrier 1 of 6688.19 mm can be obtained according to the equation (3).

Figure 4:
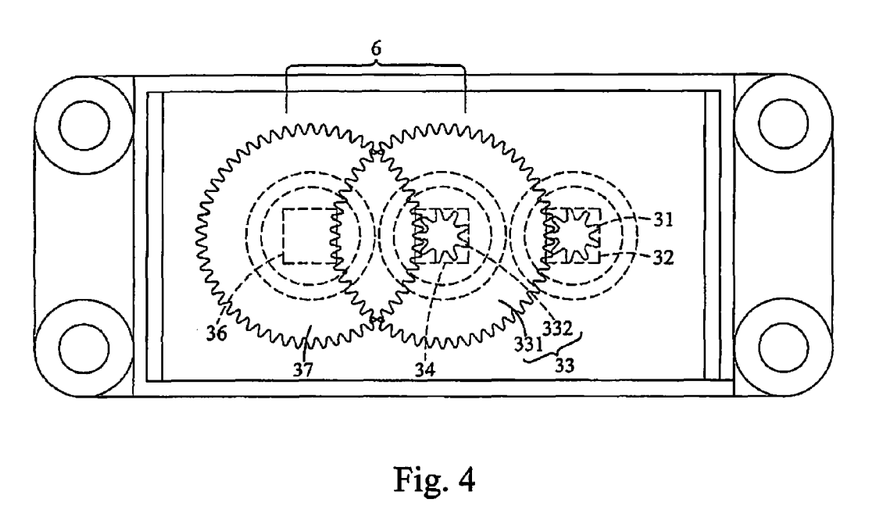
FIG. 4 is a schematic view of a second embodiment of the current-time position detecting device of the present invention.

A second embodiment of the current-time position detecting device of the present invention will be described with reference to FIG. 4. The second embodiment is different from the first embodiment in the revolution counting unit 6. The revolution counting unit 6 of this embodiment is designed in such a way that a second gear 33 is provided to indicate the number of revolutions of a first gear 31, and a third gear 37 is provided to indicate the number of revolutions of the second gear 33.

Specifically, the revolution counting unit 6 of the present embodiment comprises a second gear 33, a second angular position sensing unit 34, a third gear 37 and a third angular position sensing unit 36. The second gear 33 is composed of an upper gear 331 and a lower gear 332 which are integrally linked. The upper gear 331 of the second gear 33 is engaged with the first gear 31, and the lower gear 332 of the second gear 33 is engaged with the third gear 37. The number of the teeth of the upper gear 331 of the second gear 33 is a multiple of the number of the teeth of the first gear 31, and a first ratio of the number of the teeth of the upper gear 331 to the number of the teeth of the first gear 31 is Yb. The number of the teeth of the third gear 37 is a multiple of the number of the teeth of the lower gear 332 of the second gear 33, and a second ratio of the teeth of the third gear 37 to the number of the teeth of the lower gear 332 is Yc.

In the present embodiment, it is given that the first gear 31 has 91 teeth, the upper gear 331 has 45 teeth, the lower gear 332 has 9 teeth, and the third gear 37 has 45 teeth. Accordingly, the first ratio Yb is 5, and the second ratio Yc is 5. In other words, the speed reduction ratio of the first gear 31 to the second gear 33 is 1:5, and the speed reduction ratio of the second gear 33 to the third gear 37 is 1:5.

The second angular position sensing unit 34 detects and outputs a second angular position B of the second gear 33, and the third angular position sensing unit 36 detects and outputs a third angular position C of the third gear 37. The second angular position sensing unit 34 and the third angular position sensing unit 36 are electrically connected to the arithmetic unit 35. The arithmetic unit 35 receives the first angular position A from the first angular position sensing unit 32, the second angular position B from the second angular position sensing unit 34 and the third angular position C from the third angular position sensing unit 36 and calculates the number of revolutions La of the first gear 31 based on the following equation (7):

$$La = B/(360/Yb) + Yb * [C/(360/Yc)] \quad (7)$$

where La is the number of revolutions of the first gear 31, B is the second angular position, Yb is the first ratio of the number of the teeth of the upper gear 331 to the number of the teeth of the first gear 31, C is the third angular position, Yc is the second ratio of the teeth of the third gear 37 to the number of the teeth of the lower gear 332.

It is noted that the following example is provided for illustrative purpose. It is given that the number of circumferential intervals per revolution X is 128, and each of the first ratio Yb and the second ratio Yc is 5. In the case that the first angular position A of 357.1875 degrees, the second angular position B of 288 degrees and the third angular position C of 288 degrees are detected, the number of revolutions La of the first gear 31 of 24 can be obtained according to the equation (7). The number of revolutions La is further substituted in the equation (1), and then the number of the total circumferential intervals D of the output shaft 21 of the electric motor 2 of 3199 is obtained. In the case that the speed reduction ratio is 1:5 and the winding shaft 4 has a diameter of, for example, 710 mm, the total displacement Dd of the movable barrier 1 of 2239.3 mm can be obtained according to the equation (3).

Figure 5A:
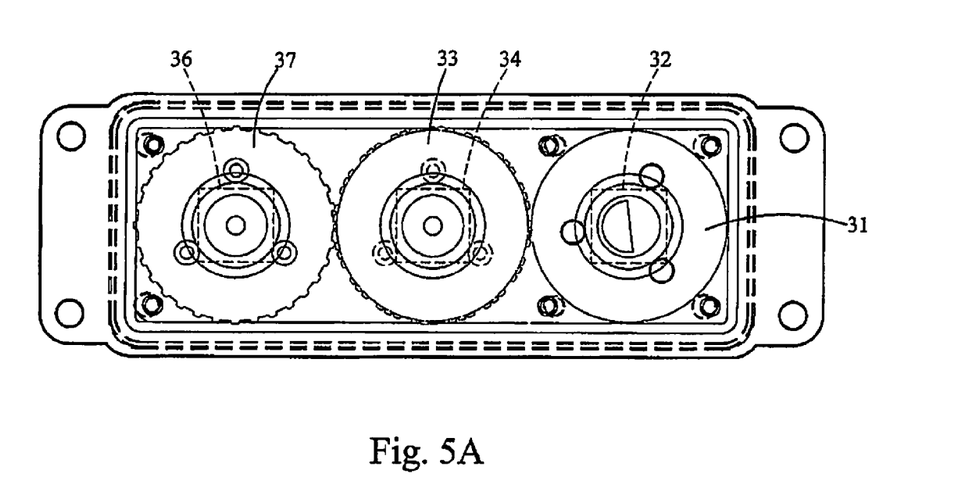
FIG. 5A is a schematic view of a third embodiment of the current-time position detecting device of the present invention.
Figure 5B:
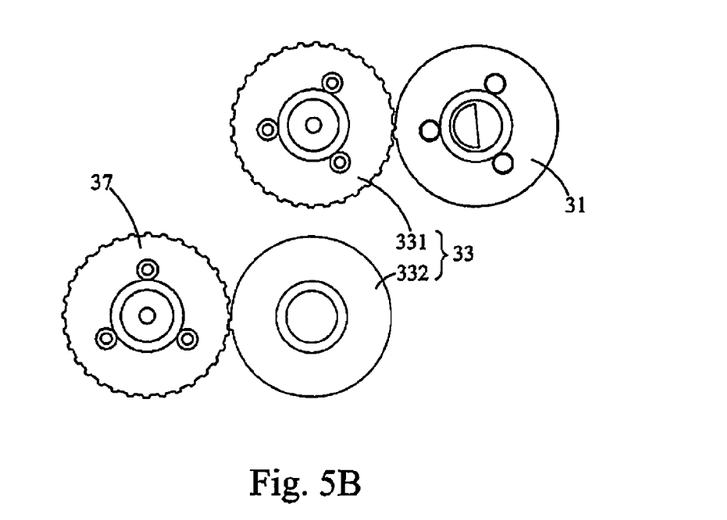
FIG. 5B is an exploded view showing the gear train of the third embodiment of the current-time position detecting device of the present invention.

A third embodiment of a current-time position detecting device of the present invention will be described with reference to FIGS. 5A and 5B, in which FIG. 5A is a schematic view of the third embodiment of the current-time position detecting device of the present invention, and FIG. 5B is an exploded view showing the gears of the third embodiment of the current-time position detecting device of the present invention. The third embodiment is different from the second embodiment in a train of reduction gears. This embodiment is designed to have intermittent gears. In this embodiment, the second gear 33 is provided to indicate the number of revolutions of the first gear 31, and the third gear 37 is provided to indicate the number of revolutions of the second gear 33.

Specifically, in this embodiment, the first gear 31 has 1 tooth, the upper gear 331 has 32 teeth, the lower gear 332 has 1 tooth, and third gear 37 has 32 teeth. Accordingly, the first ratio Yb is 32, and the second ratio Yc is 32. In other words, the speed reduction ratio of the first gear 31 to the second gear 33 is 1:32, and the speed reduction ratio of the second gear 33 to the third gear 37 is also 1:32.

It is noted that the following example is provided for illustrative purposed. It is given that the number of circumferential intervals per revolution X is 128, the first ratio Yb is 32, and the second ratio Yc is 32. In the case that the first angular position A of 0, the second angular position B of 123.75 degrees, the third angular position C of 0 are detected, the number of revolutions La of the first gear 31 of 11 can be obtained according to the equation (7). The obtained number of revolutions La is further substituted in the equation (1), and then the number of the total circumferential intervals D of the output shaft 21 of the electric motor 2 of 1408 is obtained. In the case that the speed reduction ratio is 1:5 and the winding shaft 4 has a diameter of, for example, 710 mm, the total displacement Dd of the movable barrier 1 of 4904.68 mm can be obtained according to the equation (3).

Figure 6A:
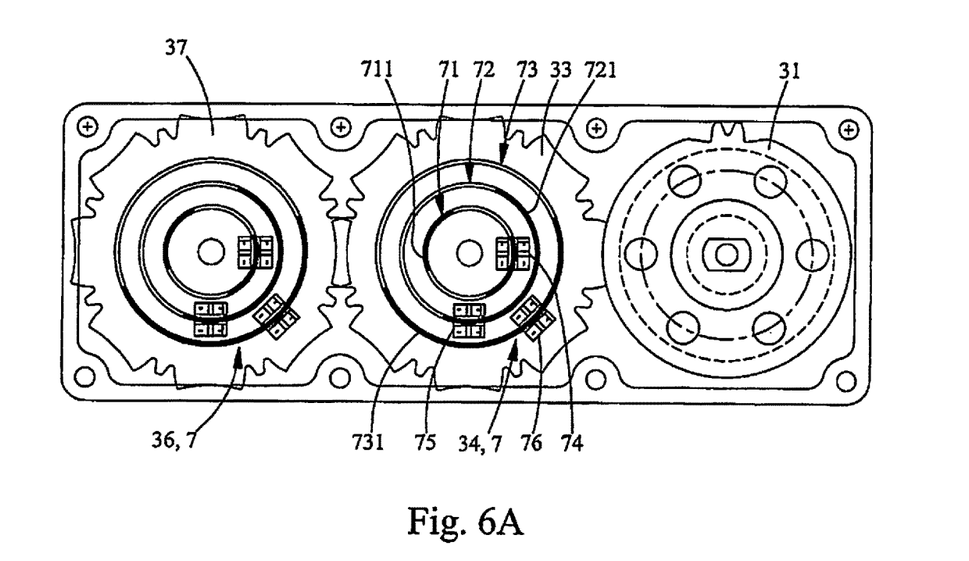
FIG. 6A is a schematic view of a fourth embodiment of the current-time position detecting device of the present invention.
Figure 6B:
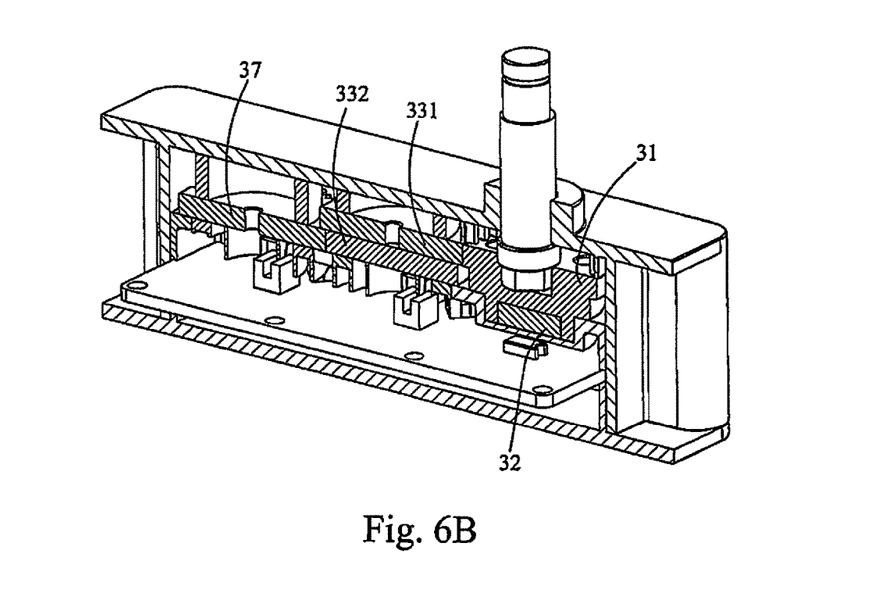
FIG. 6B is a sectional perspective view of the fourth embodiment of the current-time position detecting device of the present invention.
Figure 6C:
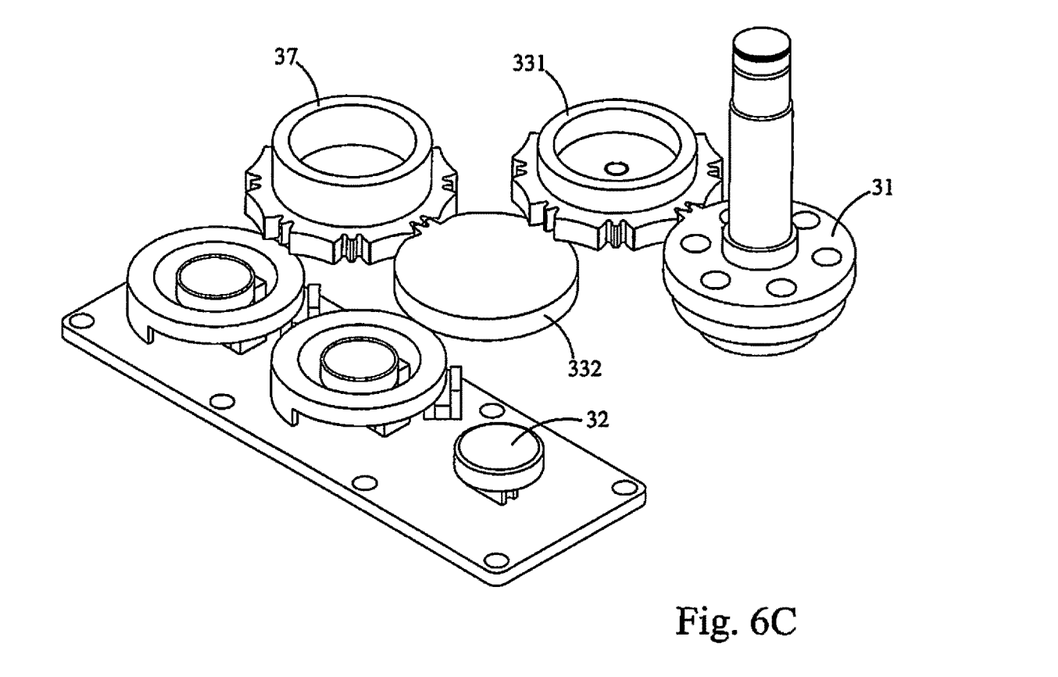
FIG. 6C is an exploded view of the fourth embodiment of the current-time position detecting device of the present invention.
Figure 6D:
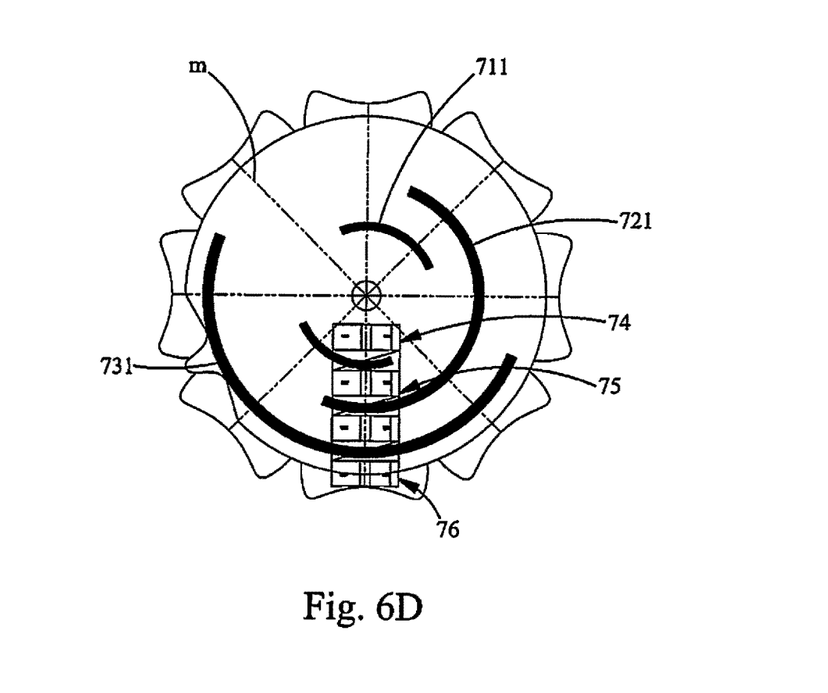
FIG. 6D is a schematic view of an optical disk angle sensing module of the fourth embodiment of the current-time position detecting device of the present invention.

A fourth embodiment of a current-time position detecting device of the present invention will be described with reference to FIGS. 6A to 6D, in which FIG. 6A is a schematic view of the fourth embodiment of the current-time position detecting device, FIG. 6B is a sectional perspective view of the fourth embodiment of the current-time position detecting device, FIG. 6C is an exploded view of the fourth embodiment of the current-time position detecting device, FIG. 6D is a schematic view of an optical disk angle sensing module of the fourth embodiment of the current-time position detecting device. The fourth embodiment is different from the third embodiment in the numbers of teeth of the first gear 31, the second gear 33 and the third gear 37 as well as the type of the second rotational angle sensing unit 34 and the third rotational angle sensing unit 36 (instead of a rotational angle magnetic induction chip, an optical disk angle sensing module 7 is used in fourth embodiment).

In the present embodiment, it is given that the first gear 31 has 1 tooth, the upper gear 331 has 8 teeth, the lower gear 332 has 1 tooth, and the third gear 37 has 8 teeth. Accordingly, the first ratio Yb is 8, and the second ratio Yc is 8. In other words, the speed reduction ratio of the first gear 31 to the second gear 33 is 1:8, and the speed reduction ratio of the second gear 33 to the third gear 37 is 1:8. Each of the first ratio Yb and the second ratio Yc of the present embodiment is 8 because a 3-bit Gray code is used.

Each optical disk angle sensing module 7 comprises an inner annular section 71, a middle annular section 72, an outer annular section 73, an inner optical transducer 74, a middle optical transducer 75 and an outer optical transducer 76. Each of the second gear 33 and the third gear 37 is provided with the inner annular section 71, the middle annular section 72 and the outer annular section 73. The inner annular section 71, the middle annular section 72 and the outer annular section 73 are arranged concentrically in this sequence from the inside to the outside. The inner annular section 71 comprises two inner light interrupter segments 711 disposed opposite to each other. Each inner light interrupter segment 711 occupies one fourth of the inner annular section 71. The middle annular section 72 comprises a middle light interrupter segment 721 occupying one second of the middle annular section 72. The outer annular section 73 comprises an outer light interrupter segment 731 occupying one second of the outer annular section 73.

As shown in FIG. 6A, for example, the inner optical transducer 74 and the middle optical transducer 75 are disposed at 3 o'clock and 6 o'clock, respectively, and the outer optical transducer 76 is disposed a halfway between the inner optical transducer 74 and the middle optical transducer 75. The inner optical transducer 74 detects the inner annular section 71, the middle optical transducer 75 detects the middle annular section 72, and the outer optical transducer 76 detects the outer annular section 73. As such, the inner annular section 71, the middle annular section 72, the outer annular section 73, the inner optical transducer 74, the middle optical transducer 75 and the outer optical transducer 76 can be arranged in such a way that the 3-bit Gray code can be used.

If the optical transducers would not be interfered from each other, the inner optical transducer 74, the middle optical transducer 75 and the outer optical transducer 76 may be aligned in a radius direction, as shown in FIG. 6D. The readings of the optical transducer at each of 8 radial lines m compose a Gray code (a binary sequence) representing a angular position of a gear associated with the optical transducer, and the angular position of the gear may indicate the number of revolutions of another gear engaged therewith. Each optical transducer is so configured that a reading of the optical transducer is "1" if a light beam emitted from an emitter is incident on a receiver and is "0" if the light beam emitted from the emitter to the receiver is interrupted by a light interrupter segment. As such, the Gray codes composed of the readings of the optical transducers at the 8 radial lines m include: [1, 1, 1], [0, 1, 1], [0, 1, 0], [1, 1, 0], [1, 0, 0], [0, 0, 0], [ 0, 0, 1], and [1, 0, 1] in this sequence. The Gray codes have the property that only one bit changes between any two consecutive Gray codes so that the failure of the optical transducers can be determined by verifying any two consecutive Gray codes.

It should be understood that the embodiment and the accompanying drawings have been described for illustrative purposes and the present invention is limited by the following claims. Further, those skilled in the art will appreciate that various modifications, additions and substitutions are allowed without departing from the scope and spirit of the invention according to the accompanying claims.

What is claimed is:

1. A door operator system comprising an electric motor having an output shaft, a current-time position detecting device and a winding shaft for winding or unwinding a movable barrier, the output shaft of the electric motor being coupled to the winding shaft, wherein the current-time position detecting device comprises:

a first gear coupled to the output shaft of the electric motor or the winding shaft;

a first angular position sensing unit provided for detecting a first angular position of the first gear;

a revolution counting unit for counting a number of revolutions of the first gear; and an arithmetic unit electrically connected to both of the first angular position sensing unit and the revolution counting unit, the arithmetic unit receiving the first angular position from the first angular position sensing unit and the number of revolutions from the revolution counting unit and calculating a number of total circumferential intervals of the output shaft of the electric motor or the winding shaft based on:

$$D=(La*X)+A/(360/X) \quad (1)$$

where D is the number of the total circumferential intervals of the output shaft of the electric motor or the winding shaft, La is the number of revolutions of the first gear, A is the first angular position, and X is a number of circumferential intervals per revolution of the first gear.

2. The door operator system of claim 1, wherein the first gear is attached on the winding shaft, the arithmetic unit calculates a total displacement of the movable barrier based on:

$$Dd=D(C/X) \quad (2)$$

where Dd is the total displacement of the movable barrier, and C is a circumference of the winding shaft.

3. The door operator system of claim 1, further comprising a speed reducer disposed between the output shaft of the electric motor and the winding shaft for speed reduction from the output shaft of the electric motor to the winding shaft in a speed reduction ratio, wherein the first gear is attached on the output shaft of the electric motor, the arithmetic unit calculates the total displacement of the movable barrier based on:

$$Dd=D*(C/X)/R \quad (3)$$

where Dd is the total displacement of the movable barrier, C is a circumference of the winding shaft, and R is the speed reduction ratio of the speed reducer.

4. The door operator system of claim 1, wherein the revolution counting unit comprises a second gear and a second angular position sensing unit, and wherein the second gear is engaged with the first gear, the second angular position sensing unit is provided for detecting a second angular position of the second gear, a number of teeth of the first gear is different from a number of teeth of the second gear, the number of circumferential intervals per revolution of the first gear is identical to the number of the teeth of the first gear, the arithmetic unit is electrically connected to the second angular position sensing unit, the arithmetic unit receives the first angular position from the first angular position sensing unit and the second angular position from the second angular position sensing unit and calculates the number of revolutions of the first gear based on:

$$La=W/(360/Y) \quad (4)$$

where W is an angular difference between the first angular position and the second angular position, and Y is the number of the teeth of the second gear.

5. The door operator system of claim 4, wherein the arithmetic unit calculates the angular difference based on:

$$W=[A-(360-B)] \text{ if } [A-(360-B)]\geq 0 \quad (5)$$

$$W=[A-(360-B)]+360 \text{ if } [A-(360-B)]<0 \quad (6)$$

where B is the second angular position.

6. The door operator system of claim 1, wherein the first angular position sensing unit is a magnetic induction rotary position chip.

7. The door operator system of claim 1, wherein the revolution counting unit comprises a second gear engaged with the first gear and a second angular position sensing unit, a number of teeth of the second gear is a multiple of a number of teeth of the first gear, the second angular position sensing unit is provided for detecting a second angular position of the second gear, the second angular position sensing unit is electrically connected to the arithmetic unit, the arithmetic unit receives the first angular position from the first angular position sensing unit and the second angular position from the second angular position sensing unit and calculates the number of revolutions of the first gear based on:

$$La=B/(360/Yb) \quad (7)$$

where B is the second angular position and Yb is a first ratio of the number of the teeth of the second gear to the number of the teeth of the first gear.

8. The door operator system of claim 7, wherein the revolution counting unit further comprises a third gear engaged with the second gear and a third angular position sensing unit, a number of teeth of the third gear is a multiple of the number of the teeth of the second gear, the third angular position sensing unit is provided for detecting a third angular position of the third gear, the third angular position sensing unit is electrically connected to the arithmetic unit, the arithmetic unit receives the first angular position from the first angular position sensing unit, the second angular position from the second angular position sensing unit and third angular position from the third angular position sensing unit and calculates the number of revolutions of the first gear based on:

$$La=B/(360/Yb)+Yb*[C/(360/Yc)] \quad (8)$$

where C is the third angular position and Yc is a second ratio of the number of the teeth of the third gear to the number of the teeth of the second gear.

9. The door operator system of claim 8, wherein the second gear is composed of an upper gear and a lower gear which are integrally linked, the upper gear is engaged with the first gear, the lower gear is engaged with the third gear, the first ratio refers to a ratio of a number of teeth of the upper gear to the number of the teeth of the first gear, and the second ratio refers to a ratio of the number of the teeth of the third gear to a number of teeth of the lower gear.

10. The door operator system of claim 8, wherein each of the second angular position sensing unit and the third angular position sensing unit is an optical disk angle sensing module comprising an inner annular section, a middle annular section, an outer annular section, an inner optical transducer, a middle optical transducer and an outer optical transducer, each of the second gear and the third gear is provided with the inner annular section, the middle annular section and the outer annular section, the inner optical transducer detects the inner annular section, the middle optical transducer detects the middle annular section, the outer optical transducer detects the outer annular section, and the inner annular section, the middle annular section, the outer annular section, the inner optical transducer, the middle optical transducer and the outer optical transducer are arranged in such a way that a 3-bit Gray code is obtained.

* * * * *